(12) United States Patent
Yokoyama

(10) Patent No.: US 7,455,315 B2
(45) Date of Patent: Nov. 25, 2008

(54) AIR BAG MODULE

(75) Inventor: Aki Yokoyama, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 193 days.

(21) Appl. No.: 11/139,582

(22) Filed: May 31, 2005

(65) Prior Publication Data

US 2006/0076758 A1  Apr. 13, 2006

(30) Foreign Application Priority Data

May 31, 2004  (JP) .............................. 2004-161393

(51) Int. Cl.
*B60R 21/16* (2006.01)

(52) U.S. Cl. ..................... 280/730.1; 280/732; 280/752

(58) Field of Classification Search .............. 280/730.1, 280/732, 740, 743.1, 743.2, 752, 753
See application file for complete search history.

(56) References Cited

U.S. PATENT DOCUMENTS

| | | | | |
|---|---|---|---|---|
| 5,785,349 A | * | 7/1998 | Storey et al. | 280/743.1 |
| 5,797,620 A | * | 8/1998 | Eyrainer | 280/730.1 |
| 5,806,881 A | * | 9/1998 | Richter et al. | 280/730.2 |
| 6,092,836 A | | 7/2000 | Saslecov | |
| 6,155,595 A | | 12/2000 | Schultz | |
| 6,499,765 B2 | * | 12/2002 | Hawthorn et al. | 280/743.1 |
| 6,568,708 B2 | * | 5/2003 | Miodek et al. | 280/740 |
| 6,685,217 B2 | * | 2/2004 | Abe | 280/730.1 |
| 6,752,417 B2 | | 6/2004 | Takimoto et al. | |
| 6,976,706 B2 | * | 12/2005 | Smith et al. | 280/753 |
| 7,040,650 B2 | * | 5/2006 | Neupert et al. | 280/729 |
| 7,055,858 B2 | * | 6/2006 | Takimoto et al. | 280/743.1 |
| 7,121,584 B2 | * | 10/2006 | Hasebe et al. | 280/743.2 |
| 7,152,877 B2 | * | 12/2006 | Hasebe et al. | 280/743.1 |
| 2002/0171230 A1 | * | 11/2002 | Takimoto et al. | 280/730.1 |
| 2005/0127643 A1 | * | 6/2005 | Abe et al. | 280/730.1 |
| 2005/0230939 A1 | * | 10/2005 | Abe et al. | 280/728.2 |
| 2006/0279073 A1 | * | 12/2006 | Hotta et al. | 280/730.1 |
| 2007/0045998 A1 | * | 3/2007 | Kashiwagi | 280/730.1 |
| 2007/0090632 A1 | * | 4/2007 | Kashiwagi | 280/730.1 |

FOREIGN PATENT DOCUMENTS

JP  2003-267178 A  9/2003

* cited by examiner

*Primary Examiner*—Paul N. Dickson
*Assistant Examiner*—Drew J. Brown
(74) *Attorney, Agent, or Firm*—Sughrue Mion, PLLC

(57) ABSTRACT

An air bag module includes an inflator for supplying gas, and an air bag supplied with the gas from the inflator, and arranged to expand between an attachment surface and legs of an occupant sitting on a seat. Thickness of the air bag in a direction from the attachment surface to the legs of the occupant is established such that a rear surface of the air bag is substantially parallel to a virtual line extending substantially along a bilateral direction of a vehicle.

6 Claims, 3 Drawing Sheets

AIR BAG MODULE

BACKGROUND OF THE INVENTION

The present invention relates to an air bag module that expands in opposition to legs of an occupant of an automobile.

Conventionally, a so-called knee air bag that is an air bag module where an air bag is expanded in opposition to knees of an occupant sitting on a seat of an automobile is known. The knee air bag is disposed, for example, below a steering wheel at the fore of a driver seat or below a glove box at the fore of a passenger seat in an instrument panel, and when a control unit detects an impact such as a collision, an air bag that has been folded and stored is expanded in order to restrict the knees of the occupant and relieve the impact given to the occupant (for example, disclosed in Japanese Patent laid open document JP 2003-267178A). In the air bag module, a member called tether is used to connect insides of the air bag to each together, and controls thickness when the air bag is expanded.

SUMMARY OF THE INVENTION

Recently, to improve design, a configuration where the instrument panel is largely bent along a direction including a horizontal direction is sometimes used. When such an instrument panel has an air bag module for protecting legs, the air bag to be expanded in a small space is expanded with inclining along the instrument panel, which sometimes leads to complexity in adjustment of expanding characteristics.

The invention, which was made in the light of such a point, relates to an air bag that is expanded against the legs of the occupant, and intends to provide an air bag module that can easily restrict the occupant into a preferable attitude.

An air bag module has an inflator for supplying gas, and an air bag supplied with the gas from the inflator and arranged to expand between an attachment surface and legs of an occupant sitting on a seat, and thickness of the air bag in a direction from the attachment surface of the air bag to the legs of the occupant is established so that a rear surface of the air bag is substantially parallel to a virtual line extending substantially along a bilateral direction of a vehicle.

In the configuration, the air bag is expanded between the attachment surface and the legs of the occupant, and restricts and protects the legs of the occupant. In the air bag, the thickness of each portion is established such that it is substantially parallel to the virtual line at the side of the attachment surface of the legs of the occupant, therefore force applied from the air bag to the occupant is equalized, and the occupant is easily supported into the preferable attitude and stably protected.

In the air bag module, the air bag includes a shell being in the form of a bag and thickness control members for connecting a plurality of portions inside the shell to each together; and thickness of air bag in the direction from the attachment surface of the air bag to the legs of the occupant is established by the thickness control members.

In this configuration, a shape of the air bag when it is expanded is easily controlled by the thickness control members, and a structure is simple, and thus production cost is reduced.

In the air bag module, the thickness control members define vents for guiding the gas to be supplied to the air bag.

In this configuration, a condition of the air bag is easily controlled using the vents while the air bag is expanded, and the structure is simple, and thus production cost is reduced.

In the air bag module, the attachment surface forms an instrument panel of a vehicle body.

In the configuration, the air bag is expanded in an appropriate form against instrument panels of various shapes to protect the occupant.

In the air bag module, bilateral sides contact to the vehicle body when the air bag is expanded.

In the configuration, the bilateral sides contact to the vehicle body, thereby the air bag is expanded into a stable position and further contacts to the attachment surface, thereby the air bag are supported at three sides and expanded into the stable position.

According to the air bag module of the invention, the occupant can be easily supported into the preferable attitude, and stably protected.

DETAILED DESCRIPTION OF THE INVENTION

Hereinafter, an air bag module according to one embodiment of the invention is described with reference to drawings.

Figure 1:
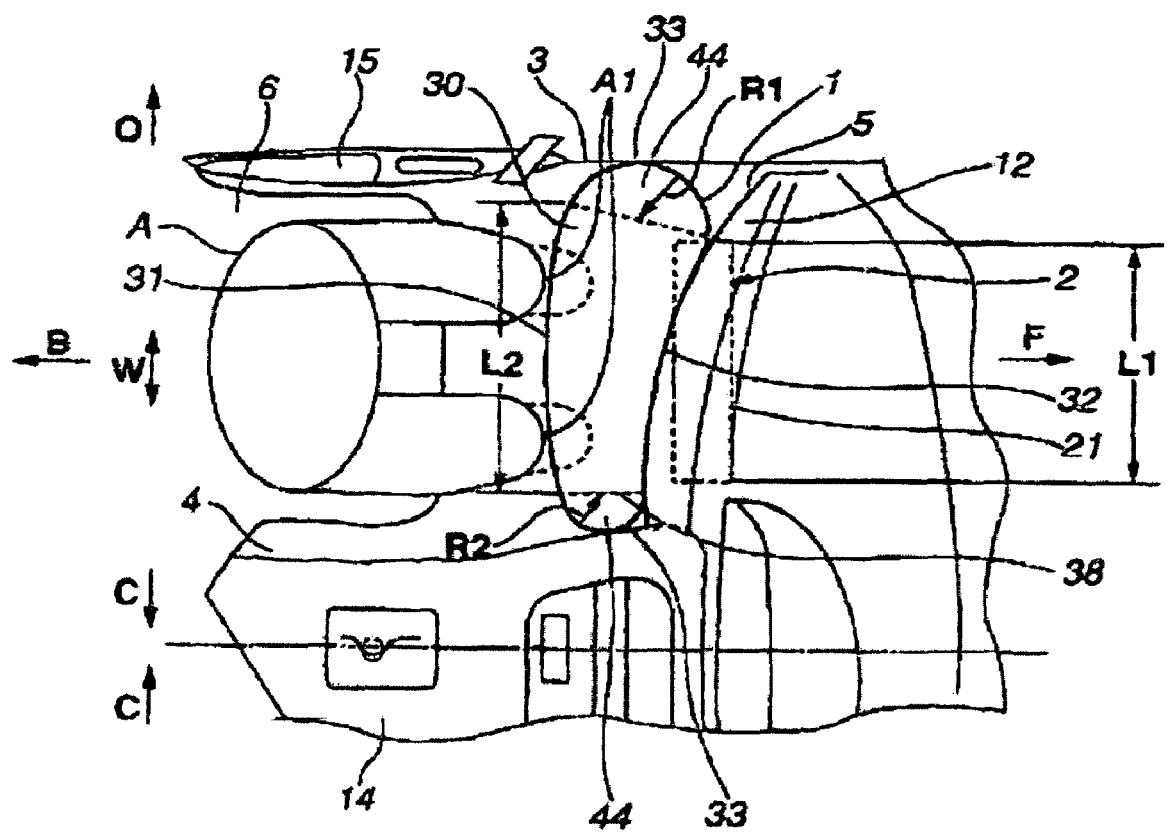
FIG. 1 is a view for illustrating an air bag when it is expanded and showing an air bag module according to one embodiment of the present invention as viewed from an upper side.
Figure 2:
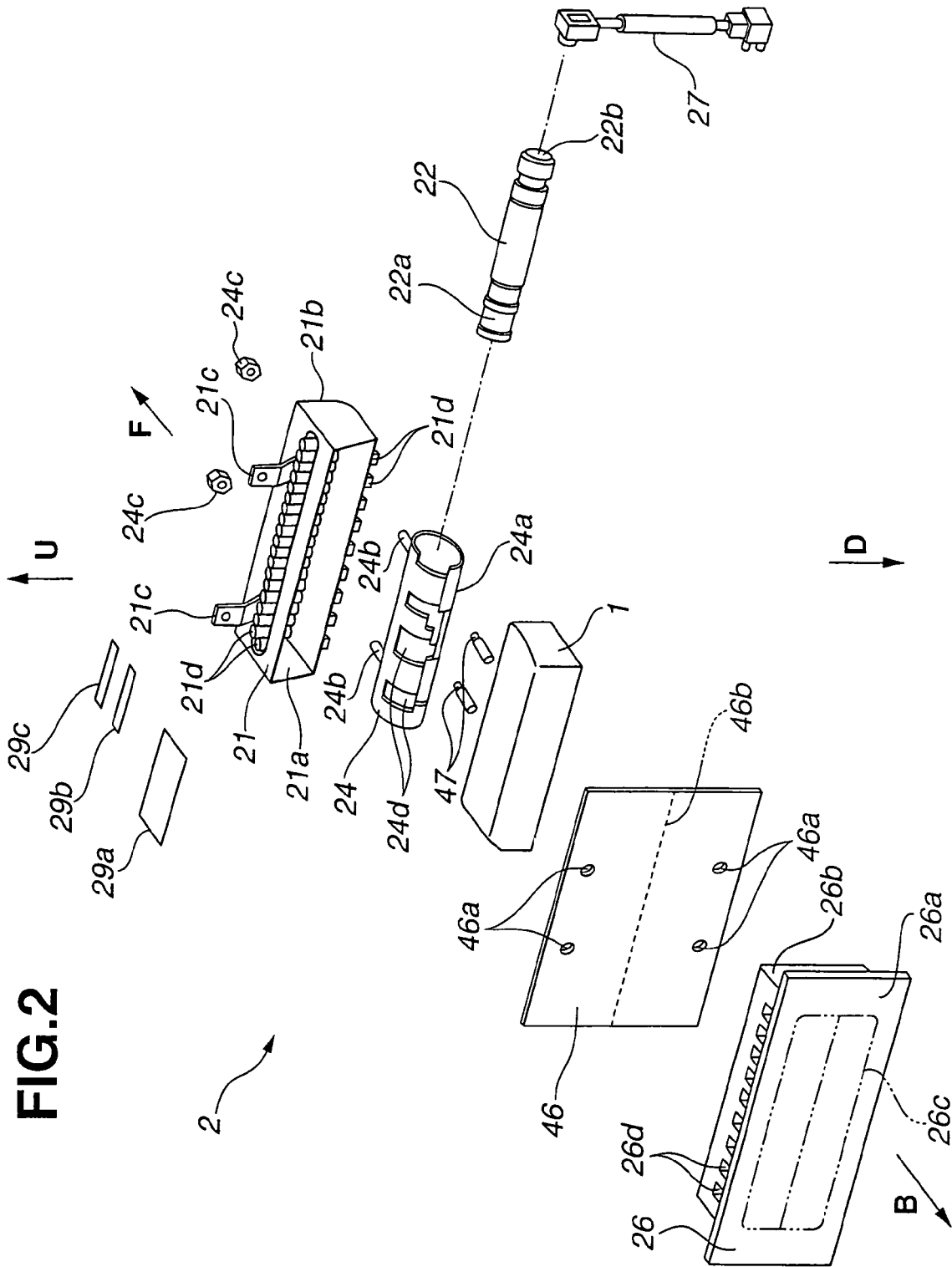
FIG. 2 is an exploded perspective view showing the air bag module of FIG. 1.
Figure 3:
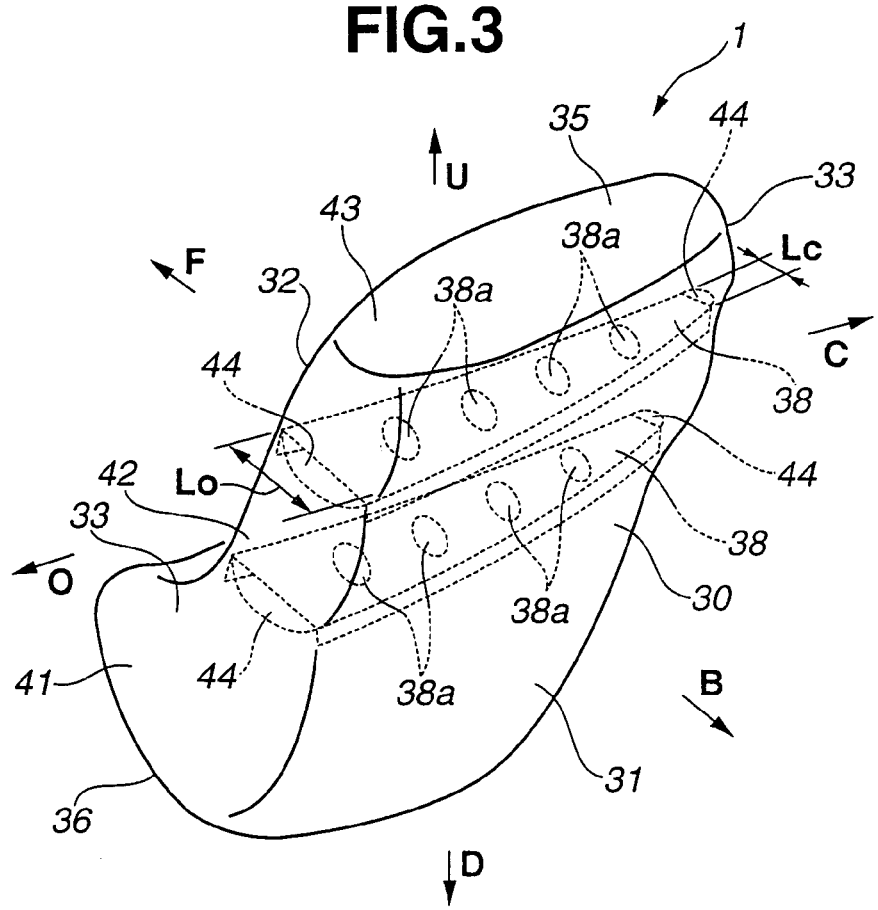
FIG. 3 is a perspective view showing the air bag of the air bag module of FIG. 1 in an expanded condition.

In FIG. 1 to FIG. 3, reference 1 is an air bag, and an air bag module 2 having the air bag 1 is disposed on a panel 5 as an attachment surface facing a vehicle compartment 4 of a vehicle body 3 of an automobile that is a vehicle as a member to be attached with the air bag as shown in FIG. 1. The air bag module 2, which is sometimes called a knee air bag, is expanded at legs of an occupant A shown in FIG. 1 as a dummy and protects a leg region of the occupant A, upon receiving an impact such as head-on collision. Hereinafter, a direction such as back-and-forth direction is described assuming that a straight advance direction of the vehicle body 3 is a standard, that is, the fore F as a direction opposite to an occupant direction, the rear B that is a side opposite to the fore F, or the occupant direction, an upside U, a downside D, a bilateral direction W, a center side C and an outside O are assumed in the description.

The vehicle body 3 includes a pair of seats 6 on either side on which the occupant A can sit in the vehicle compartment 4, and a windshield glass and an instrument panel 12 are disposed at the fore F of the seats 6. Furthermore, the panel 5, which is called dash panel, is disposed at a lower portion or an intermediate portion of the downside D of the instrument panel 12, and the air bag module 2 is attached on the panel 5 in opposition to respective seats 6. One of the seats, which is not shown, is a driver seat, and a steering wheel is disposed between the instrument panel 12 and the panel 5. The other of the seats is a passenger seat, and a glove box is disposed between the instrument panel 12 and the panel 5. The instrument panel 12 is formed to bend in a curved surface pattern along the bilateral direction W and a vertical direction to improve design, and in the bilateral direction W, the instrument panel 12 bends in a manner of directing to a front side from the center side C having a center console 14 to the outside O having a door 15. In addition to the air bag module 2, not shown air bag modules are provided on the steering wheel, the instrument panel 12, sides of the seats 6, and a roof side-rail in the vehicle compartment 4.

A virtual face including a virtual line that is a line connecting between front face sides of legs A1 at both sides of the occupant A sitting on the seat 6 is a virtual line perpendicular to a back-and-forth direction, or substantially parallel to the bilateral direction W when it is seen from an upper side as shown in FIG. 1, and an inclined line inclining toward the fore F with extending from the upside U to the downside D when it is seen from a side.

As shown in FIG. 2, the air bag device 2 includes a case member 21 as an attachment member, an inflator 22 to be attached to the case member 21, a retainer 24, the air bag 1, and a cover member 26. The case member 21, which is also called housing, includes a body 21b in a substantially box-shape where a rear face is formed to be an opening 21a. In addition, the body 21b is attached with a bracket 21c fixed to the vehicle body 3, and a plural number of attachment strips 21d are provided on upper and lower faces of the body 21b. The inflator 22 is in a substantially cylindrical shape, and a gas injector 22a is provided near one end thereof, and a connector 22b is provided at the other end. The inflator 22 is connected to a control unit via a harness 27 which is connected to the connector 22b, and injects gas from the gas injector 22a according to a starting signal supplied from the control unit via the harness 27. The retainer 24 includes a retainer body 24a in a substantially cylindrical shape and a pair of attachment bolts 24b fixed to the retainer body 24a by welding, and the retainer 24 is attached to the case member 21 by nuts 24c screwed with the attaching bolts 24b. Gas vent holes 24d through which gas passes are formed in the retainer body 24a. Furthermore, the cover member 26, which is also called a lid, is formed integrally using, for example, synthetic resin, and includes a face plate 26a, and an attachment plate 26b provided in a manner of protruding from a back face side of the face plate 26a or a front face side to a front side. A tear line 26c that is a breaking part weaker than other portions is formed in the face plate 26a, for example, in substantially H shape. The attachment plate 26b is in a square-cylinder shape, and a plural number of attachment receptacles 26d in a square-hole shape are formed in correspondence with the attachment strips 21d on upper and lower faces of the plate 26b. Thus, the cover member 26 is attached to the case member 21 in a way that the face plate 26a covers the opening 21a in a condition that the attachment plate 26b is fit over an outside of the body 21b, and the attachment strips 21d are engaged with the attachment receptacles 26d. Furthermore, a plural number of labels 29a, 29b, 29c and the like showing cautions, product number and the like are attached to the case member 21 and the like.

The air bag 1 is formed into a bag shape by sewing a sheet or plural sheets of base cloth/cloths, and stored in the case member 21 with being folded into a predetermined form. As shown in FIG. 1 and FIG. 3, in a folded condition, a shell or outer surface 30 in a bag shape of the air bag 1 includes a rear face 31 as a first face in opposition to the rear B or the occupant, a front face 32 as a second face in opposition to the fore F or the panel 5 side, side faces 33, 33 as sides connecting between both ends of the front face 32 and the rear face 31 in the bilateral direction W, a top panel or top face 35 connecting between both upper ends of the front face 32 and the rear face 31, and a bottom panel or bottom face 36 connecting between both lower ends of the front face 32 and the rear face 31. Furthermore, connection members 38 as a thickness control member are disposed inside the shell 30. The connection members 38, which are also called expansion control member, suspension strap, or tether, are formed by opening a plural number of inner vents 38a in a round hole pattern in the base cloth having substantially square pattern in plane vision in the embodiment. The connection members 38 are connected by sewing front and rear edges with the front face 32 and the rear face 31, and controls a shape of the shell 30 of the air bag 1 when it is expanded, especially thickness in the back-and-forth direction and divides the inside of the air bag 1 into a plural number of air chambers. That is, in the air bag 1, a first air chamber 41 located at a lower side of the shell 30, a second air chamber 42 located above the first air chamber 41, and a third air chamber 43 located above the second air chamber 42 are formed by the two connection members 38, and the air chambers 41, 42 and 43 are in communication with each together through the inner vents 38a provided in respective connection members 38 and outer vents 44 as vents that are gaps between respective connection members 38 and the side faces 33, 33 of the shell 30. Moreover, a gas introduction part in which the inflator 22 is disposed is established in the first air chamber 41 in the air bag 1. Furthermore, a not-shown insertion port is formed at a lower end near the bottom panel 36, and attachment holes are formed close to the insertion port.

Furthermore, the air bag 1 is formed in an odd-shape that is not symmetry in the bilateral direction W, in accordance with the shape of the instrument panel 12 curved along the bilateral direction W, that is, it is formed such that a length or thickness Lo of the air bag 1 in the back-and-forth direction at the outside O is larger than a length or thickness Lc of the air bag 1 in the back-and-forth direction at the center side C so that the rear face 31 is parallel to the bilateral direction W in a condition that the air bag 1 is expanded and the front face 32 contacts to the panel 5 of the instrument panel 12. Moreover, the air bag 1 is formed to be combined with a wrapping 46 made of nonwoven fabric and rivets 47 to hold the folded form.

Next, a process for assembling the air bag module 2 is described.

First, the air bag 1, inflator 22, and retainer 24 are combined to form an assembly. In this process, first the harness 27 is attached to an end of the inflator 22, and the inflator 22 is combined and fixed to an inside of the retainer body 24a. Then, the retainer 24 attached with the inflator 22 is inserted from the insertion port into an inside of the air bag 1, and the attachment bolt 24b is drawn out from the attachment holes, and further a rear end of the air bag 1 is folded back to pass the attachment bolt 24b through the attachment holes, and the air bag 1 is connected to the retainer 24 using the rivets 47. Next, starting from a condition that shaping is made in a way that the air bag 1 is stretched flat, the air bag 1 is wound from a front end and folded into a roll form, and an area near the retainer 24 is folded in a form of bellows. Next, both ends in the bilateral direction W of the portion folded in the roll form are folded up in a kind of approximate Z shape so that it has a lateral size storable in the case member 21. In this condition, the air bag 1 is covered by the wrapping 46, and holes 46a provided in the wrapping 46 are hooked on the attachment bolts 24b, thereby the air bag 1 is held with being folded into a predetermined form, thereby the assembly is formed.

Next, the assembly is inserted into the case member 21 through the opening 21a, the attachment bolts 24b are passed through not-shown attachment holes formed in the case member 21, and the nuts 24c are screwed with the attachment bolts 24b from an outside of the case member 21, thereby the assembly, or the air bag 1, inflator 22 and retainer 24 are fixed to the case member 21. Next, the attachment plate 26b is fit over an outside of the body 21b and attachment strips 21d are engaged with the attachment receptacles 26d, and then the cover member 26 is attached to the case member 21 in a manner that the face plate 26a covers the opening 21a or the air bag 1, thereby the air bag module 2 is formed.

Then, the brackets 21c are connected to components of the vehicle body 3, and the air bag module 2 is attached to the vehicle body 3 such that the face plate 26a of the cover member 26 has same surface level as the panel 5, and the harness 27 is electrically connected to a control device, thereby the air bag module 2 is arranged in the vehicle body 3.

Next, operation of the air bag module 2 is described.

When the control device detects the impact such as the collision between automobiles, the control device supplies electric power as the starting signal through the harness 27, and actuates the inflator 22. When gas is supplied from the inflator 22 into the air bag 1, the air bag 1 expands inside the case member 21, and first breaks the wrapping 46 at the tear line 46b weaker than other portions, and then breaks the cover member 26 at the tear line 26c, thereby projects the air bag 1. In the air bag 1, first, the first air chamber 41 into which the gas is first introduced is expanded and contacts to respective portions of the vehicle body 3, thereby a position of the air bag 1 is stabilized, and then the gas is supplied via the inner vents 38a and the outer vents 44, thereby the second air chamber 42 and the third air chamber 43 are sequentially expanded. Finally, the air bag 1 is expanded into a shape shown in FIG. 1 and FIG. 3. That is, the air bag 1 expands in opposition to the legs A1 including the knees A2 of the occupant A moving to the fore F due to inertia, and restricts the knees A2 of the occupant A and thus restrains relative movement with respect to the vehicle body 3, thereby protects the knees by restraining direct contact of the knees to the panel 5 or a floor entering the vehicle compartment 4.

When the occupant A is supported in this way, since the air bag 1 expands into a small space between the instrument panel 12 and the legs A1 of the occupant A, the front face 32 of the air bag 1 contacts to the surface of the instrument panel 12, and repellent force or reaction force to an occupant A side is secured using the surface of the instrument panel 12 as a reaction surface. In the air bag 1, sizes of the connection members 38 are changed with the location in accordance with the shape of the instrument panel 12. In the embodiment, since sizes are established such that the size Lo in the back-and-forth direction at the outside O is larger than the size Lc in the back-and-forth direction at the center side C, and since the rear face 31 is made such that it is parallel to the bilateral direction W, or parallel to the virtual face formed by the front faces of the legs A1 of the occupant A when the air bag 1 is expanded, the left and right legs A1 of the occupant A moving relatively to the front face F can be restricted evenly or in an optimum force distribution and securely protected.

Thus, the air bag 1 can be held parallel to the bilateral legs A1 and knees A2 of the occupant A with respect to the rear face 31 that is the contacting surface in the back-and-forth direction as an energy absorbing direction, by the connection members 38 provided in the shell 30 of the air bag 1; the bilateral legs of the occupant A are supported by even reaction force; the occupant A is supported in a stable attitude without being inclined; and effects of other air bag modules provided in the vehicle compartment 4 than the air bag module 2 that is the knee air bag can be fully exhibited, and a matter that application of force is concentrated on a part of the occupant A, for example, one of the legs A1 can be restrained.

Moreover, the air bag module has a simple structure, and can be easily applied to the diversified shapes of the instrument panel 12 by changing the shape of the connection members 38, consequently production cost can be easily reduced.

For example, today, design of the instrument panel 12, where a shift unit or an audio attachment portion at an upper part of a console box are largely set at a region of the center console 14 as the center of the instrument panel 12, and the instrument panel 12 is curved in a manner of retracting to the fore F at the outside O comparatively having a space margin or at a door 15 side, is used, and expansion characteristics of the air bag 1 can be easily improved in accordance with the instrument panel 12 having such design.

The connection members 38 are made to be a partition wall for dividing a laterally intermediate portion of the air bag 1 into an upper portion and a lower portion, and outer vents 44 are formed at both sides of the connection members 38, therefore a desired, preferable expansion process or expansion characteristics can be easily realized. Thus, although the air bag 1 has not symmetric shape in the bilateral direction W, in accordance with the shape of the instrument panel 12, since a flow rate of the gas directing to the air chambers 42, 43 at the upside U can be regulated using the outer vents 44 provided at both sides of the connection members 38, opening areas of the outer vents 44 are controlled, thereby the expansion characteristics of both sides of the air bag 1 are controlled, and thus the air bag 1 can be evenly expanded with respect to the bilateral direction W.

For example, as shown in FIG. 1, while the portion at the outside O largely expanding in the back-and-forth direction needs to be supplied with sufficiently much gas compared with the portion at the center side C, a lateral size L2 of the connection members 38 is set larger than a lateral size L1 of the case member 21 for storing the folded air bag 1 (L1<L2), and the outer vents 44 at the outside O is formed large compared with the outer vents 44 at the center side C, thereby, for example, regarding radiuses of semicircular spaces formed by side edges of the connection members 38 and the side faces 33, a radius R1 of an outer space at the outside O is formed larger than a radius R2 of an inner space at the center side C (R1>R2), thereby the portion at the outside O of the air bag 1 can be expanded quickly with having sufficient reaction force similarly as the portion at the center side C.

Furthermore, when the air bag 1 expands and supports the occupant A, the bilateral side faces 33 contact to the center console 14 and the door 15 forming the vehicle body 3, thereby the air bag 1 is supported at three sides including the front face 32, and an expanded position of the air bag 1 is stably fixed to a desired position, that is, a position of the rear face 31 as the contacting face is stabilized, consequently characteristics for restricting the occupant A can be easily improved.

In this way, since the air bag 1 can be stably expanded into a desired position, an attachment position and an attachment angle of the air bag module 2 to the instrument panel 12 can be appropriately established, and the production cost can be easily reduced, and the degree of freedom of the design of the instrument panel 12 can be improved.

Figure 4:
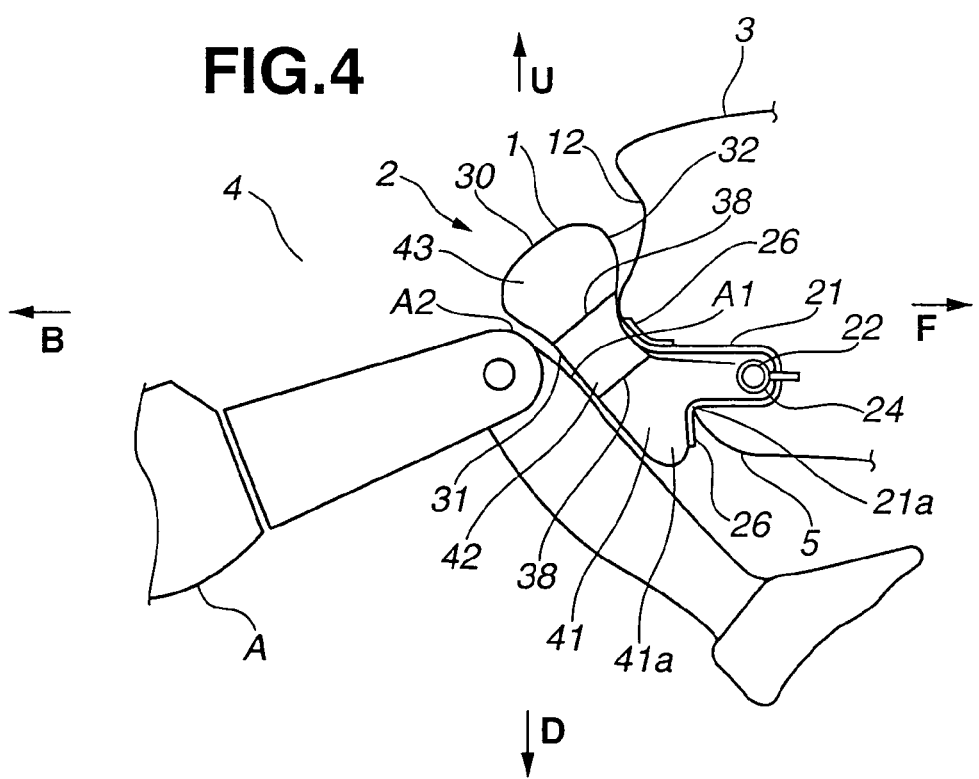
FIG. 4 is a view for illustrating an air bag when it is expanded and showing an air bag module according to another embodiment of the invention.

Although a configuration where the rear face 31 expands parallel to the bilateral direction W with respect to the instrument panel 12 curved in the bilateral direction W was described in the above embodiment, in addition to the bilateral direction W, or in place of the bilateral direction W, for example, as shown in FIG. 4, the positions and shapes of the connection members 38 are controlled in correspondence with the instrument panel 12 curved in a vertical direction, thereby the rear face 31 of the air bag 1 can be expanded substantially parallel to the virtual face of the front faces of the legs A1 of the occupant A. Thus, again in the configuration shown in FIG. 4, first to third air chambers 41, 42 and 43 are formed from the lower side to the upper side in the air bag 1 using two connection members 38, and the first to third air chambers 41, 42 and 43 are sequentially expanded by the gas supplied from the inflator 22. In addition, in the configuration shown in FIG. 4, the lower connection member 38 for dividing between the first and second air chambers 41 and 42 is aligned to a corner of the opening 21a of the case member 21 or a projection port formed in the cover member 26, thereby a preferable expansion form can be easily realized. Furthermore, FIG. 4 shows a condition of the first air chamber 41 where the first air chamber 41 expands lower than the opening 21a of the case member 21, and a lower supporting chamber 41a is formed.

Moreover, although the connection members 38 using two base cloths were used in the embodiment, the connection members 38 can be formed using one base cloth or at least three foundation cloths without being limited to that configuration.

Moreover, the air bag 1 can be also expanded into a predetermined shape by controlling the shape of the shell 30 in addition to the shape of the connection members 38.

The invention can be also provided in other mobile objects than a vehicle in addition to the air bag module provided in the vehicle.

This application is based on a prior Japanese Patent Application No. 2004-161393. The entire contents of the Japanese Patent Application No. 2004-161393 with a filing date of May 31, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air bag module for protecting legs of an occupant, the air bag module comprising:
   an inflator for supplying gas; and
   an air bag supplied with the gas from the inflator, and arranged to expand between an attachment surface and the occupant sitting on a seat, said air bag divided into a plurality of chambers, each of said chambers comprising a rear surface for facing the occupant and a front surface for facing the attachment surface, and a first side face and a second side face connecting between the front surface and the rear surface at opposing bilateral sides of said air bag, respectively, wherein, upon inflation of said air bag, a thickness of each one of said chambers between said rear surface and said front surface at said second side face is larger than a thickness between said rear surface and said front surface at said first side face, while said rear surface of the air bag is substantially parallel to a virtual line extending substantially along a bilateral direction of a vehicle.

2. The air bag module as claimed in claim 1, wherein the air bag includes thickness control members each for connecting the front surface and the rear surface of the air bag; and the thickness of the air bag between the front surface and the rear surface is established by the thickness control members.

3. The air bag module as claimed in claim 2, wherein the thickness control members define vents for guiding the gas to be supplied to the air bag.

4. The air bag module as claimed in claim 1, wherein the attachment surface forms an instrument panel of a vehicle body.

5. The air bag module as claimed in claim 4, wherein said front surface contacts the attachment surface, and said first side face and said second side face of the air bag contact the vehicle body when the air bag is expanded.

6. The air bag module as claimed in claim 1, wherein said air bag has an asymmetrical shape as viewed along a cross section taken in the bilateral direction.

\* \* \* \* \*